INVENTORS
RODOLFO V. de la CRUZ
RICHARD E. GOODMAN
By
Lothrop & West
ATTORNEYS

United States Patent Office 3,538,755
Patented Nov. 10, 1970

1

3,538,755
DEVICE AND METHOD FOR DETERMINING ROCK STRESS
Rodolfo v. de la Cruz and Richard E. Goodman, Berkeley, Calif., assignors to The Regents of The University of California, Berkeley, Calif.
Filed Sept. 16, 1968, Ser. No. 760,035
Int. Cl. G01n 3/00
U.S. Cl. 73—88                               8 Claims

ABSTRACT OF THE DISCLOSURE

Stress in rock in situ is determined by cutting a hole into the rock and measuring the diameter of the hole adjacent to the cutting tool and also at a location remote from the cutting tool and comparing the measurements. Measurement is done by a deflecting or resilient sleeve positioned in the hole around and behind the cutting tool. The method includes the steps of measuring the diameter of a hole in rock immediately adjacent to the hole cutting tool, measuring the deflected diameter of the hole wall away from the hole cutting tool and relating the measurements as an indication of rock stress.

---

There is a substantial problem in determining the stresses in a rock body in situ primarily for the purposes of construction, geological analysis and the like, and it is therefore an object of the invention to provide a means and method for determining in situ the stress distribution and pattern within native rock.

Another object of the invention is to provide a device for determining rock stress which can readily be utilized in various different environments and which will promptly afford, even at a remote location, an indication of the stress pattern in the rock.

Another object of the invention is to provide a device for determining rock stress without the necessity of drilling two coaxial holes; i.e. without overcoring.

Another object of the invention is to provide a method for determining the stress in rock by measuring the deflection of the walls of a hole in the rock under different conditions.

A further object of the invention is to provide means for quickly and readily determining the stresses in a rock.

Figure 1:
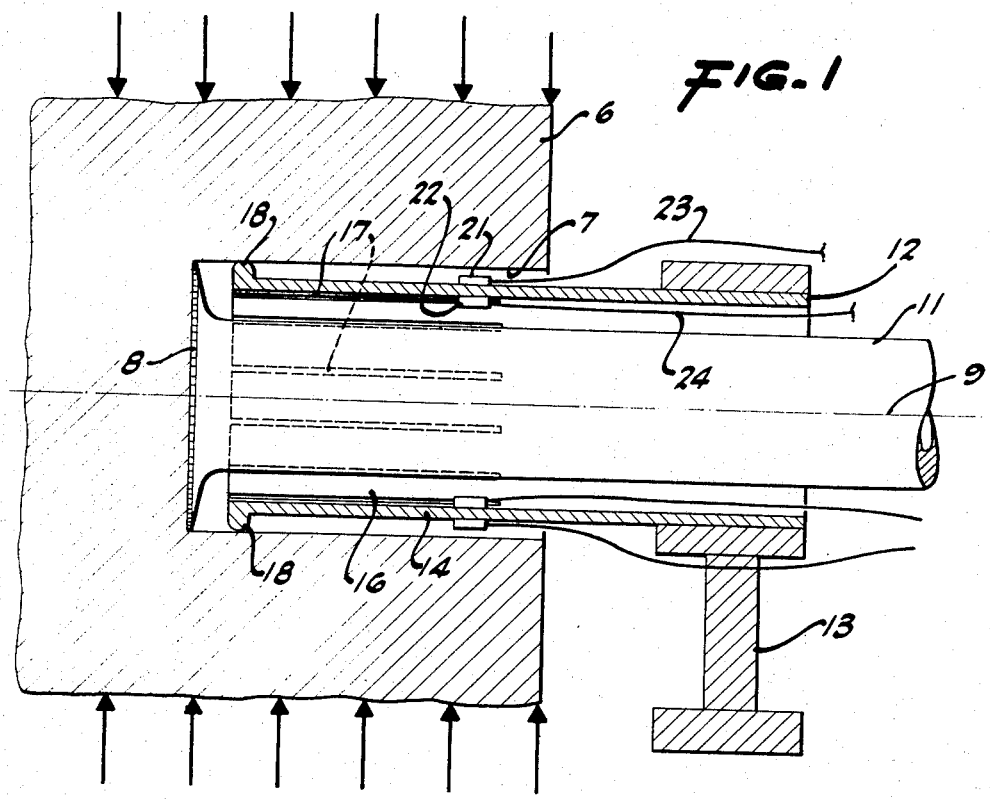
Figure 2:
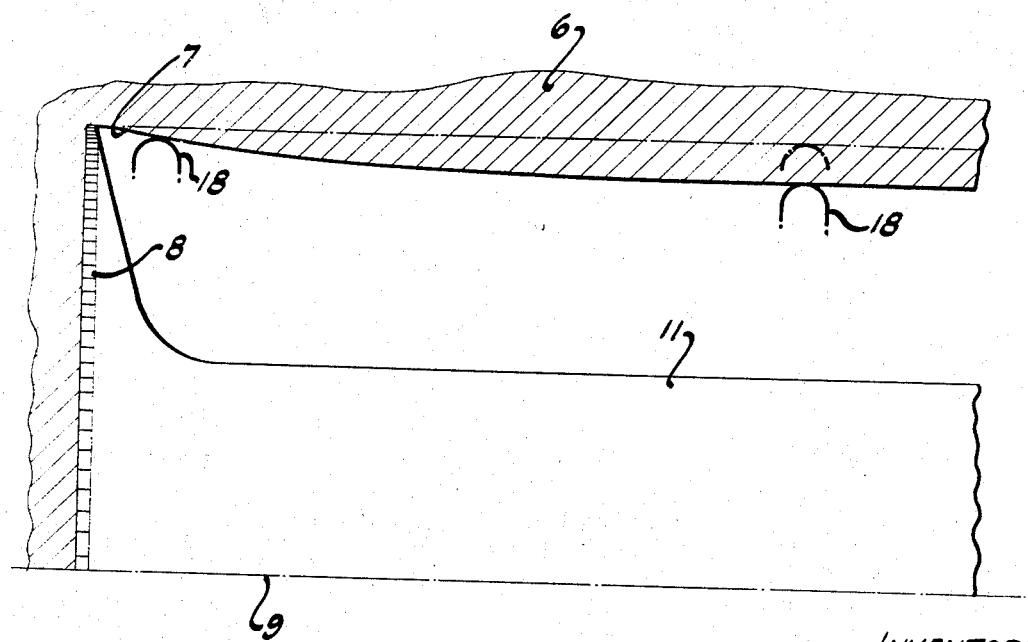

The foregoing objects together with others are attained in the embodiment of the invention and the practice of the process or method of the invention as set forth in the following description. The device and method are illustrated, partially diagrammatically, in the figures, in which:

FIG. 1 is a cross-section on an axial plane through a device for determining rock stress pursuant to the invention; and FIG. 2 is an enlargement of the showing in FIG. 1 with the deflection of the wall of the bore in the rock being exaggerated for clarity.

Pursuant to the invention, the device and method are practiced in connection with a body of rock 6 considered to be in situ; for example, in the earth, and to have been originally uninterrupted. The rock is of a sufficiently consolidated nature that it can transmit stresses and can with reasonable uniformity withstand the cutting of a hole 7 therein. For this reason there is provided a cutting member 8 designed to be rotated around a longitudinal axis 9 by means of a rotary stem 11 at the end of which the cutting head 8 is mounted. The cutting head is both rotated and advanced axially into the rock 6 and produces generally a uniformly cut, circular hole 7.

Designed to surround the stem 11 is a measuring device including a sleeve 12 which at one end can be supported on a mounting 13 for axial or rotational movement. The sleeve is generally solid except that at its remote or free end it is divided into a number of fingers 14, 16, etc. separated from each other by intervening axial cuts 17. Since the material of the sleeve and particularly of the fingers 14 is resilient, the fingers are utilized to sense the diameter of the wall of the hole 7 and to deflect as the hole wall moves. For increased precision, the remote end of each of the fingers 14, 16, etc. is slightly enlarged to provide a contact member 18 designed to be easily movable axially along the hole wall and also to be spring urged or resiliently urged outwardly into immediate, close contact with the hole wall 7.

Since it is desired to get some indication of the diameter of the hole as measured by the fingers, and particularly to get or detect the difference in diameter of the hole as it may yield under stress, one (and preferably more) of the fingers is provided at an appropriate location with some movement or position measuring means. While various devices may be utilized, we preferably utilize strain gauges 21 and 22 disposed on opposite sides of the finger and connected by leads 23 and 24 to a remote location at which a suitable indicator or recorder (not shown) is provided.

In the use of this arrangement and in the practice of the method, the hole is bored into the rock 6 progressively from the exterior in a direction along the axis 9 substantially as shown in FIG. 1. During this time the drill head may be followed into the hole very closely by the contact members 18 of the fingers, so that an indication of diameter is immediately afforded in a location to the drill head or in the just-cut portion of the hole wall. When such an indication has been had at one location, the drill head 8 is further advanced in the direction of the axis while the measuring device is held stationary in an axial sense. This means that the drill and the measuring device are disposed farther and farther apart at more remote locations. This is the customary practical technique.

As an alternative under almost theoretically precise conditions the drill can be left axially stationary in one location, the fingers can measure the wall diameter adjacent to that location, and then the sleeve 12 can be retracted so that the sleeve after initially measuring the diameter of the hole wall adjacent the cutting means then measures the wall diameter at a point remote from the cutting means. The indicating device in either instance affords one reading of the hole diameter adjacent one location and of a hole diameter remote therefrom. These diameters when compared give an indication of the relative convergence or divergence or the inward or outward deflection of the hole wall. The direction of deflection corresponds to the direction of stress; i.e. compression or tension. Since there are a number of fingers arranged in an array around the axis and since preferably each of the fingers or at least opposite fingers of a diametrical pair are provided with the deflection measuring means, there is afforded a polar or circumferential group of readings which when compared can show the condition of stress in a circular pattern around the wall of the hole.

As particularly shown in FIG. 2, in which the radial dimensions are grossly exaggerated, the wall 7 adjacent the cutting head 8 is initially of exactly the same diameter as the cutting head. A measurement by the members 18 at a point as close as practicable to the cutting head and on the trailing side thereof affords a similar measurement which is very nearly that or only slightly less than that of the cut zone since the surrounding compressive stresses in the rock can move the hole wall in but slightly. The diameter is greater if the surrounding stresses are tensile. However, as the cutting head advances or as the measuring device becomes more remote from the just-cut portion, then the members 18 (at the right-hand location in FIG. 2) afford a reading of a lesser (or greater) diameter since the stresses have reduced (or increased) the bore or hole wall at that location to a substantially uniform measurement. The contour or shape of the wall in axial cross-section is a composite curve. There is substantially no deflection near the cutting tool because of the support of the rock still in place, there is a minimum (or maximum) diameter at a remote point at which the hole walls have deflected their maximum amount, and in between there are intermediate amounts of deflection roughly as shown by the exaggerated curve in FIG. 2.

By comparison of the readings at different points axially and polarly it is possible to arrive at a clear and quite precise knowledge of the stress conditions in the surrounding rock.

What is claimed is:

1. A device for determining rock stress comprising means for cutting a hole progressively into rock, resilient means for engaging the wall of said hole on the trailing side of said cutting means, means mounting said resilient means for movement of said resilient means axially along said hole relative to said cutting means between one position adjacent to and another position rearwardly remote from said cutting means, said resilient means including means for measuring the deflection of said resilient means in response to movement of said wall.

2. A device as in claim 1 in which said resilient means includes a sleeve having a circumferential array of integral fingers extending along said hole.

3. A device as in claim 2 in which said measuring means includes a sensor on at least one of said fingers.

4. A device as in claim 1 in which said cutting means includes a cutting head and a stem of lesser diameter than said cutting head, said resilient means includes a sleeve, and means support said sleeve to surround and move axially of said stem.

5. A method for determining rock stress comprising the steps of cutting a hole progressively into rock by advancing a cutting tool into said rock, measuring the diameter of said hole adjacent the just-cut portion prior to retracting said cutting tool from said hole, measuring the diameter of said hole at a location remote from said just-cut portion, and thereafter retracting said cutting tool from said hole.

6. A method as in claim 5 including the step of measuring the difference in the diameter adjacent said just-cut portion and the diameter at said remote location.

7. A method as in claim 5 including the step of measuring said diameter progressively between said just-cut portion and said remote location.

8. A method as in claim 5 including the step of measuring said diameter at a fixed location adjacent said just-cut portion and then cutting said hole in a direction farther into said rock and away from said fixed location.

References Cited

UNITED STATES PATENTS

| | | | |
|---|---|---|---|
| 2,719,363 | 10/1955 | Montgomery et al. | 175—40 X |
| 2,898,761 | 8/1959 | Hast | 73—88 |
| 3,349,498 | 10/1967 | Oliver et al. | 33—178 |

JERRY W. MYRACLE, Primary Examiner

U.S. Cl. X.R.

33—178